(12) United States Patent
Walsh et al.

(10) Patent No.: US 8,718,077 B1
(45) Date of Patent: May 6, 2014

(54) APPARATUS AND METHOD FOR DYNAMICALLY LIMITING OUTPUT QUEUE SIZE IN A QUALITY OF SERVICE NETWORK

(75) Inventors: Hugh Walsh, Los Gatos, CA (US); Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 234 days.

(21) Appl. No.: 13/220,545

(22) Filed: Aug. 29, 2011

Related U.S. Application Data

(63) Continuation of application No. 12/840,327, filed on Jul. 21, 2010, now Pat. No. 8,009,689, which is a continuation of application No. 11/523,185, filed on Sep. 19, 2006, now Pat. No. 7,764,703, which is a continuation of application No. 10/150,147, filed on May 17, 2002, now Pat. No. 7,110,415.

(51) Int. Cl.
*H04L 12/28* (2006.01)

(52) U.S. Cl.
USPC .......................................... 370/412; 370/413

(58) Field of Classification Search
None
See application file for complete search history.

(56) References Cited

U.S. PATENT DOCUMENTS

| | | | |
|---|---|---|---|
| 5,541,912 A | 7/1996 | Choudhury et al. | |
| 5,682,553 A | 10/1997 | Osborne | |
| 5,802,055 A | 9/1998 | Krein et al. | |
| 5,889,779 A | 3/1999 | Lincoln | |
| 5,901,147 A | 5/1999 | Joffe | |
| 5,914,934 A | 6/1999 | Rathnavelu | |
| 5,982,296 A | 11/1999 | Wakasa et al. | |
| 6,018,515 A | 1/2000 | Sorber | |
| 6,021,086 A | 2/2000 | Joffe | |
| 6,021,132 A * | 2/2000 | Muller et al. | 370/412 |
| 6,169,748 B1 | 1/2001 | Barbas et al. | |
| 6,205,118 B1 | 3/2001 | Rathnavelu | |
| 6,205,149 B1 * | 3/2001 | Lemaire et al. | 370/401 |
| 6,246,682 B1 | 6/2001 | Roy et al. | |
| 6,256,315 B1 | 7/2001 | Barbas et al. | |
| 6,262,986 B1 | 7/2001 | Oba et al. | |
| 6,262,989 B1 | 7/2001 | Gemar et al. | |
| 6,304,552 B1 | 10/2001 | Chapman et al. | |
| 6,430,153 B1 * | 8/2002 | Hughes et al. | 370/230.1 |
| 6,487,202 B1 | 11/2002 | Klausmeier et al. | |

(Continued)

OTHER PUBLICATIONS

Nang, Ge and Hamdi, Mounir, "On the Provision of Quality-of-Service Guarantees for Input Queued Switches," IEEE Communications Magazine, Dec. 2000, pp. 62-77.

(Continued)

*Primary Examiner* — Phirin Sam

(57) ABSTRACT

A network switch including a plurality of ports; a memory, and a queue controller. The queue controller is configured to: maintain a list of pointers to a first plurality of buffers in the memory; of the first plurality of buffers, selectively allocate a first buffer to a first port of the plurality of ports; in response to i) the first port receiving a first frame of data, ii) the first buffer being allocated to the first port, and iii) the first frame being stored in the memory, remove the pointer to the first buffer from the list of pointers; transfer, to an output queue associated with a second port of the plurality of ports, the pointer to the first buffer; and in response to the first frame of data being sent from the second port, add the pointer to the first buffer back to the list of pointers.

20 Claims, 10 Drawing Sheets

(56) References Cited

U.S. PATENT DOCUMENTS

| | | | |
|---|---|---|---|
| 6,526,060 B1 | 2/2003 | Hughes et al. | |
| 6,539,024 B1 | 3/2003 | Janoska et al. | |
| 6,577,625 B1 | 6/2003 | Chiou et al. | |
| 6,618,390 B1 | 9/2003 | Erimli et al. | |
| 6,625,159 B1 | 9/2003 | Singh et al. | |
| 6,628,609 B2 | 9/2003 | Chapman et al. | |
| 6,631,130 B1 | 10/2003 | Roy et al. | |
| 6,674,720 B1 * | 1/2004 | Passint et al. | 370/235 |
| 6,687,254 B1 | 2/2004 | Ho et al. | |
| 6,704,316 B1 | 3/2004 | He | |
| 6,813,266 B1 | 11/2004 | Chiang et al. | |
| 6,954,463 B1 | 10/2005 | Ma et al. | |
| 7,007,071 B1 | 2/2006 | Brown | |
| 7,035,273 B1 | 4/2006 | Pannell et al. | |
| 7,110,415 B1 | 9/2006 | Walsh et al. | |
| 7,151,744 B2 | 12/2006 | Sarkinen et al. | |
| 7,209,440 B1 | 4/2007 | Walsh et al. | |
| 7,257,124 B2 * | 8/2007 | Goetzinger et al. | 370/413 |
| 7,346,063 B1 | 3/2008 | Herbst | |
| 7,346,067 B2 * | 3/2008 | Chung et al. | 370/412 |
| 7,369,574 B1 | 5/2008 | Parruck et al. | |
| 7,710,991 B1 * | 5/2010 | Li et al. | 370/414 |
| 2003/0084246 A1 * | 5/2003 | Tran et al. | 711/122 |

OTHER PUBLICATIONS

Seifert, Rich, "The Switch Book: The Complete Guide to LAN Switching Technology," Wiley Computer Publishing; New York, New York, 2000, Chapter 13, pp. 515-544.

Cyriel Minkenberg and Ton Engbersen, "A Combined Input and Output Queued Packet-Switched System Based on PRIZMA Switch-on-a-Chip Technology," IEEE Communications Magazine, Dec. 2000, pp. 70-77.

H. Jonathan Chao, Cheuk H. Lam, Eui Oki, "Broadband Packet Switching Technologies: A Practical Guide to ATM Switches and IP Routers," New York, New York, 2001, pp. 321-324.

Abbijit K. Choudbury and Ellen L. Hahne, "Dynamic Queue Length Thresholds for Shared-Memory Packet Switches," Bell Laboratories, Holmdel, NJ, IEEE/ACM Transactions on Networking, vol. 6, No. 2, Apr. 1998, pp. 130-140.

* cited by examiner

APPARATUS AND METHOD FOR DYNAMICALLY LIMITING OUTPUT QUEUE SIZE IN A QUALITY OF SERVICE NETWORK

CROSS-REFERENCE TO RELATED APPLICATIONS

This application is a continuation of U.S. application Ser. No. 12/840,327, filed Jul. 21, 2010, which is a continuation of U.S. application Ser. No. 11/523,185 (now U.S. Pat. No. 7,764,703), filed Sep. 19, 2006, which is a continuation of U.S. application Ser. No. 10/150,147 (now U.S. Pat. No. 7,110,415), filed May 17, 2002.

This application is related to U.S. application Ser. No. 10/071,417 (now U.S. Pat. No. 7,035,273), filed Feb. 6, 2002, and U.S. application Ser. No. 10/141,096 (now U.S. Pat. No. 7,209,440), filed May 7, 2002.

BACKGROUND

The present invention relates generally to data communications, and particularly to a queuing system implementing multiple classes of service within a network switch.

The rapidly increasing popularity of networks such as the Internet has spurred the development of network services such as streaming audio and streaming video. These new services have different latency requirements than conventional network services such as electronic mail and file transfer. New quality of service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

FIG. 1 shows a simple network 100 in which a network switch 102 connects two devices 104A and 104B. Each of devices 104 can be any network device, such as a computer, a printer, another network switch, or the like. Switch 102 transfers data between devices 104 over channels 106A and 106B, and can also handle an arbitrary number of devices in addition to devices 104. Channels 106 can include fiber optic links, wireline links, wireless links, and the like.

FIG. 2 is a block diagram of a conventional shared-memory output-queue store-and-forward network switch 200 that can act as switch 102 in network 100 of FIG. 1. Switch 200 has a plurality of ports including ports 202A and 202N. Each port 202 is connected to a channel 204, a queue controller 206 and a memory 208. Each port 202 includes an ingress module 214 that is connected to a channel 204 by a physical layer (PHY) 210 and a media access controller (MAC) 212. Referring to FIG. 2, port 202A includes an ingress module 214A that is connected to channel 204A by a MAC 212A and a PHY 210A, while port 202N includes an ingress module 214N that is connected to channel 204N by a MAC 212N and a PHY 210N. Each port 202 also includes an egress module 216 that is connected to a channel 204 by a MAC 218 and a PHY 220. Referring to FIG. 2, port 202A includes an egress module 216A that is connected to channel 204A by a MAC 218A and a PHY 220A, while port 202N includes an egress module 216N that is connected to channel 204N by a MAC 218N and a PHY 220N.

FIG. 3 is a flowchart of a conventional process 300 performed by network switch 200. At power-on, queue controller 206 initializes a list of pointers to unused buffers in memory 208 (step 302). A port 202 of switch 200 receives a frame from a channel 204 (step 304). The frame enters the port 202 connected to the channel 204 and traverses the PHY 210 and MAC 212 of the port 202 to reach the ingress module 214 of the port 202. Ingress module 214 requests and receives one or more pointers from queue controller 206 (step 306). Ingress module 214 stores the frame at the buffers in memory 208 that are indicated by the received pointers (step 308).

Ingress module 214 then determines to which channel (or channels in the case of a multicast operation) the frame should be sent, according to methods well-known in the relevant arts (step 310). Queue controller 206 sends the selected pointers to the egress modules 216 of the ports connected to the selected channels (step 312). These egress modules 216 then retrieve the frame from the buffers indicated by the pointers (step 314) and send the frame to their respective channels 204 (step 316). These egress modules 216 then release the pointers for use by another incoming frame (step 318). The operation of switch 200 is termed "store-and-forward" because the frame is stored completely in the memory 208 before leaving the switch 200. The store-and-forward operation creates some latency. Because all of the switch ports 202 use the same memory 208, the architecture of switch 202 is termed "shared memory."

The queue controller 206 performs the switching operation by operating only on the pointers to memory 208. The queue controller 206 does not operate on the frames. If pointers to frames are sent to an egress module 216 faster than that egress module 216 can transmit the frames over its channel 204, the pointers are queued within that port's output queue 216. Because pointers accumulate only at the output side of switch 200, the architecture of switch 200 is also termed "output-queued." Thus switch 200 has a store-and-forward, shared-memory, output-queued architecture.

In an output-queued switch, the queue controller must enqueue a frame received on a port to all of the output queues selected for that frame before the next frame is completely received on that port. Thus at any time only one complete frame can be present at each input port, while the output queues can be arbitrarily large. Thus the latency of an output-queued switch has two components: ingress latency and egress latency. Ingress latency is the period between the reception of a complete frame at an ingress module and the enqueuing of the pointers to that frame at all of the output queues to which the frame is destined. Egress latency is the period between enqueuing of the pointers to a frame in an output queue of a port and the completion of the transmission of that frame from that port.

Of course, QoS is relevant only when the switch is congested. When the amount of data entering the switch exceeds the amount of data exiting the switch, the output queues fill with pointers to frames waiting to be transmitted. If congestion persists, the memory will eventually fill with frames that have not left the switch. When the memory is full, incoming frames are dropped. When memory is nearly full and free memory buffers are rare, QoS dictates the free buffers be allocated to frames having high classes of service. But when the switch is uncongested, free memory buffers are plentiful, and no preferential treatment of frames is necessary to achieve QoS.

QoS is implemented in an output-queued store-and-forward switch by controlling the overall latency for each frame such that frames having a high class of service experience less latency than frames having lower classes of service. Many conventional solutions exist to reduce egress latency. However, solutions for reducing ingress latency in an output-queued store-and-forward switch either do not exist, or have proven unsatisfactory.

SUMMARY

In general, in one aspect, this specification describes a network switch including a plurality of ports; a memory, and a queue controller. The queue controller is configured to: maintain a list of pointers to a first plurality of buffers in the memory, wherein the first plurality of buffers is available to store a frame of data; of the first plurality of buffers available to store a frame of data, selectively allocate a first buffer to a first port of the plurality of ports; in response to i) the first port receiving a first frame of data, ii) the first buffer being allocated to the first port, and iii) the first frame being stored in the memory, remove the pointer to the first buffer from the list of pointers; transfer, to an output queue associated with a second port of the plurality of ports, the pointer to the first buffer; and in response to the first frame of data being sent from the second port, add the pointer to the first buffer back to the list of pointers, wherein the first buffer is again available to store a frame of data.

The details of one or more implementations are set forth in the accompanying drawings and the description below. Other features will be apparent from the description and drawings, and from the claims.

DRAWINGS

Figure 1:
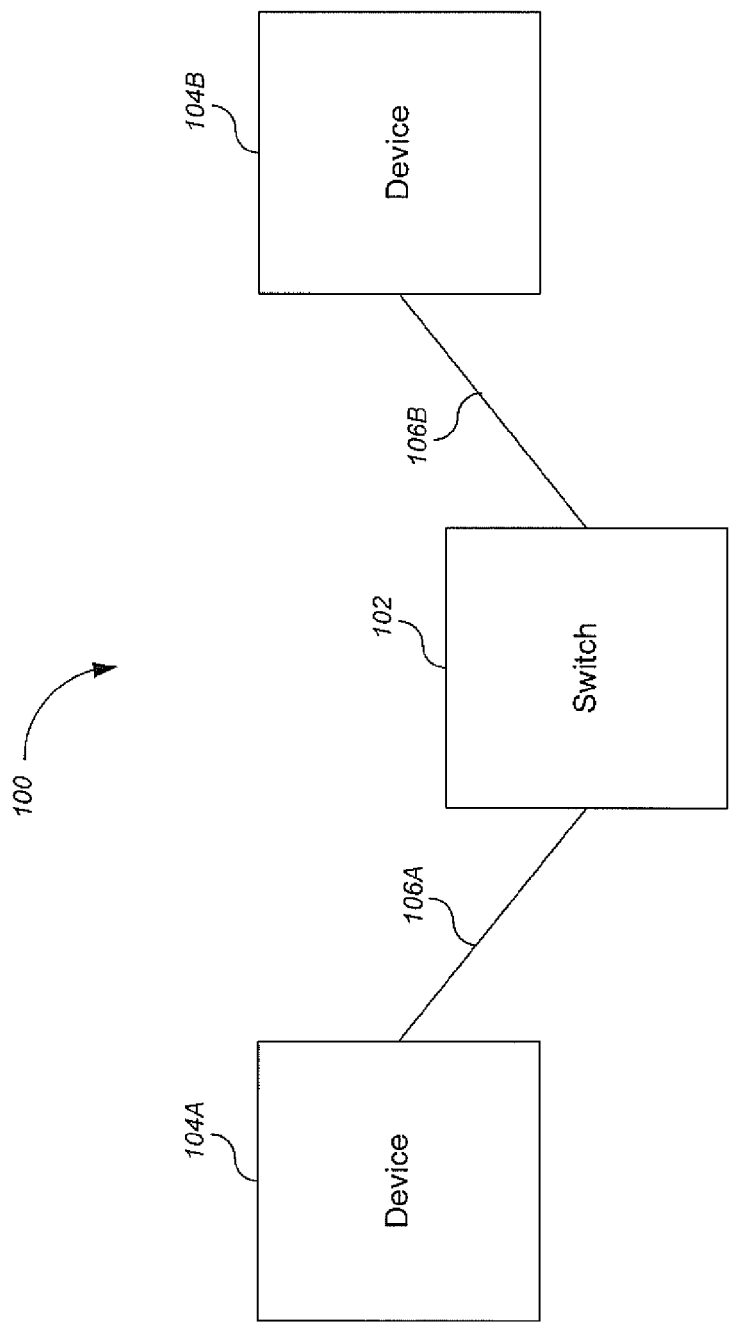
FIG. 1 shows a simple network in which a network switch connects two devices.

The leading digit(s) of each reference numeral used in this specification indicates the number of the drawing in which the reference numeral first appears.

DETAILED DESCRIPTION

Figure 2:
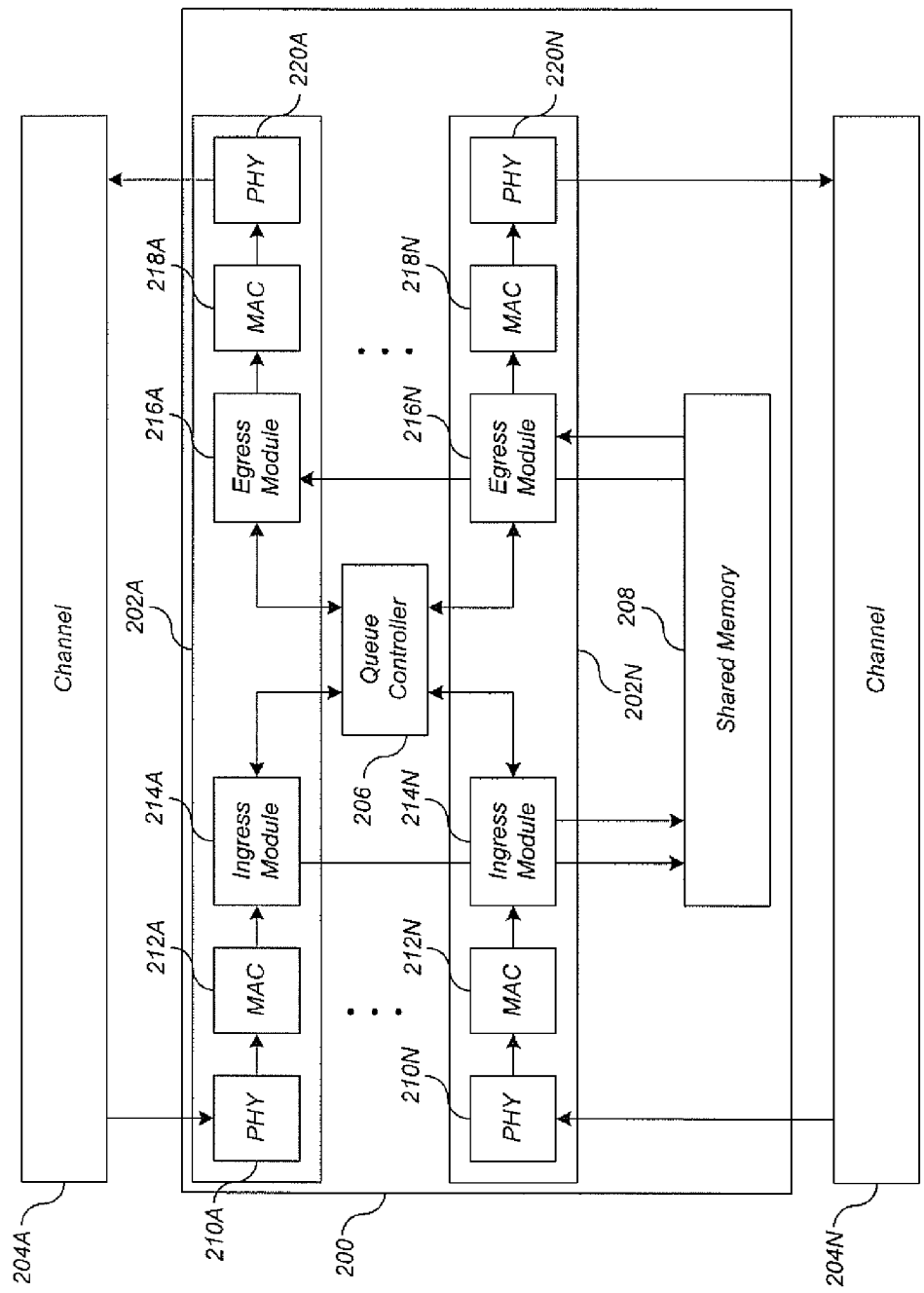
FIG. 2 is a block diagram of a conventional shared-memory output-queue store-and-forward network switch that can act as the switch in the network of FIG. 1.
Figure 3:
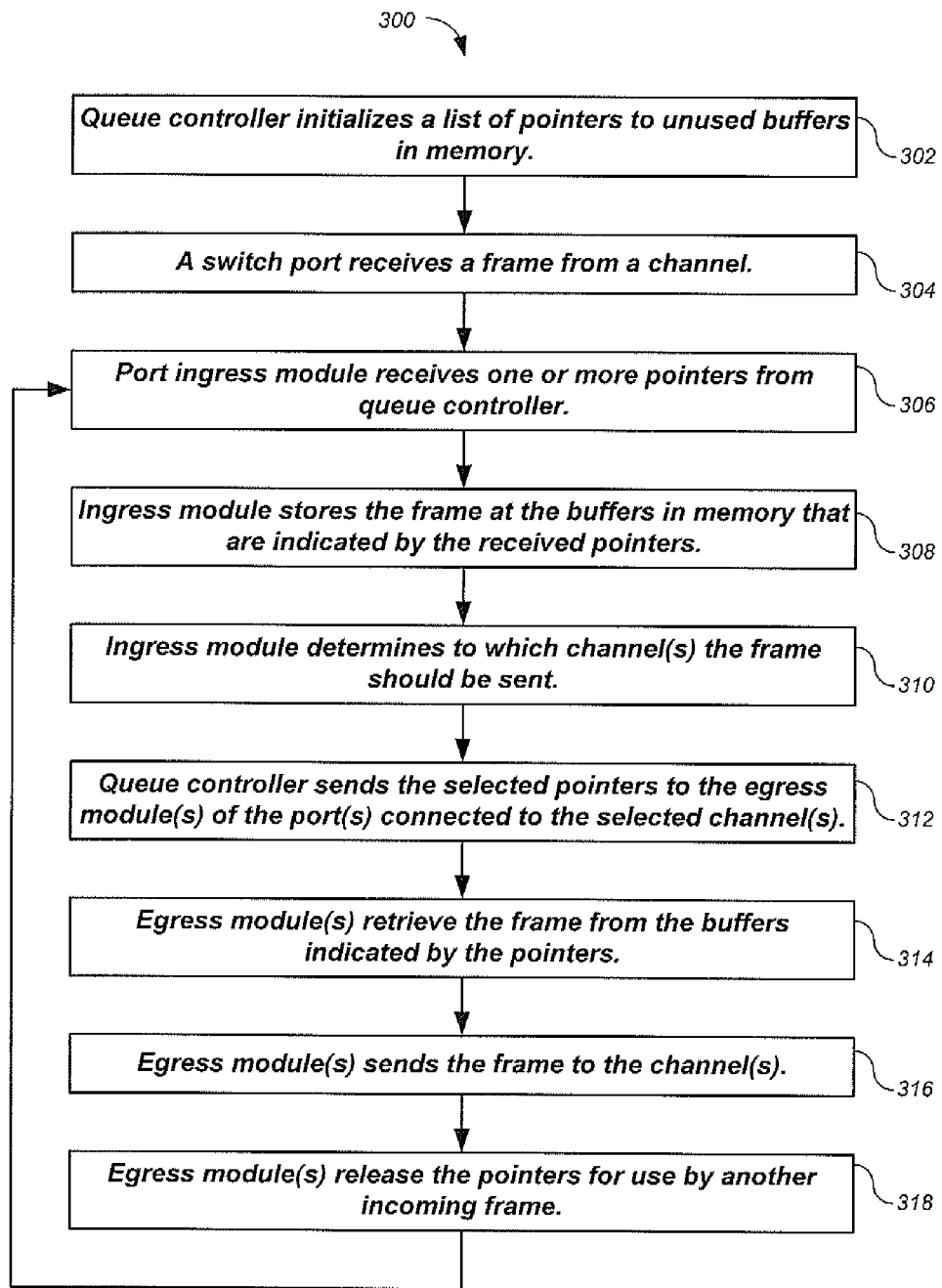
FIG. 3 is a flowchart of a conventional process performed by the network switch of FIG. 2.
Figure 4:
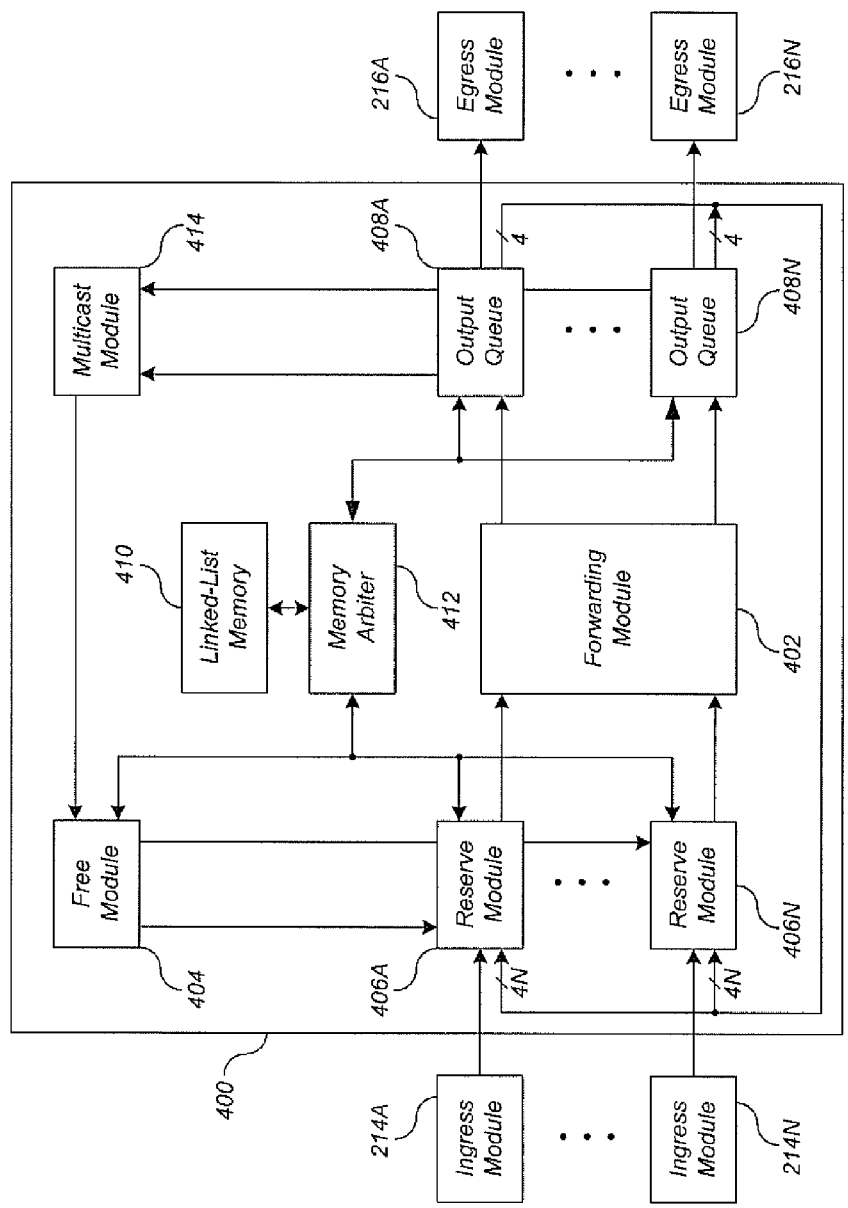
FIG. 4 is a block diagram of a queue controller suitable for use as the queue controller in the network switch of FIG. 2.

FIG. 4 is a block diagram of a queue controller 400 suitable for use as queue controller 206 in network switch 200 of FIG. 2. Queue controller 400 can be implemented using hardware, software, or any combination thereof. Queue controller 400 includes a forwarding module 402, a free module 404, a plurality of reserve modules 406A through 406N, and a plurality of output queues 408A through 408N. Each reserve module 406 is connected to one of ingress modules 214. Each output queue 408 is connected to one of egress modules 216.

Free module 404 and reserve modules 406 each contain one linked list of pointers to buffers in shared memory 208. Each output queue 408 contains a priority queue for each class of service implemented by switch 400. Each priority queue contains one linked list of pointers to buffers in shared memory 208. In one implementation, switch 400 implements four classes of service labeled class 0 through class 3, with class 3 having the highest priority. In this implementation, each output queue 408 contains four priority queues. Other implementations can implement fewer or greater classes of service, as will be apparent to one skilled in the relevant art after reading this description.

All of the linked lists for free module 404, reserve modules 406, and output queues 408 are stored in a linked-list memory 410. A memory arbiter 412 arbitrates among competing requests to read and write linked-list memory 410. Each of free module 404, reserve modules 406, and output queues 408 maintains an object that describes its linked list. Each of these objects maintains the size of the list and pointers to the head and tail of the list. Each of free module 404, reserve modules 406, and output queues 408 traverses its linked list by reading and writing the "next" links into and out of linked list memory 410.

Figure 5:
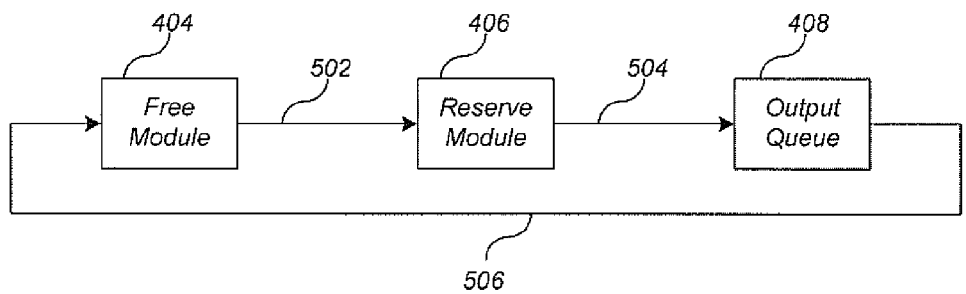
FIG. 5 depicts the manner in which pointers to buffers circulate within the queue controller of FIG. 4.

Free module 404 contains pointers to buffers in memory 208 that are available to store newly-received frames (that is, the buffers have an available status). Each reserve module 406 contains a list of pointers to available buffers that are reserved for the port housing that reserve module. FIG. 5 depicts the manner in which these pointers circulate within queue controller 400. Queue controller 400 allocates pointers from free module 404 to reserve modules 406 according to the methods described below (flow 502). Buffers associated with pointers in a free module 404 have an available status until a frame is stored in the buffers. Storing a frame in one or more buffers changes the status of those buffers to unavailable. To forward a frame to an output port, the frame is stored in a buffer in memory 208, and the pointers to that buffer are transferred to the output queue 408 for that output port (flow 504). When a frame is sent from an output port to a channel 106, the pointers for that frame are returned to free module 404, thereby changing the status of the pointers to available (flow 506).

Multicast module 414 handles multicast operations. In linked-list memory 410, pointers associated with the start of a frame also have a vector including a bit for each destined output port for the frame. When an output port finishes transmitting a frame, the output queue passes the frame's pointers to multicast module 414, which clears the bit in the destination vector associated with that output port. When all of the bits in the destination vector have been cleared, the frame's pointers are returned to free module 404.

Figure 6:
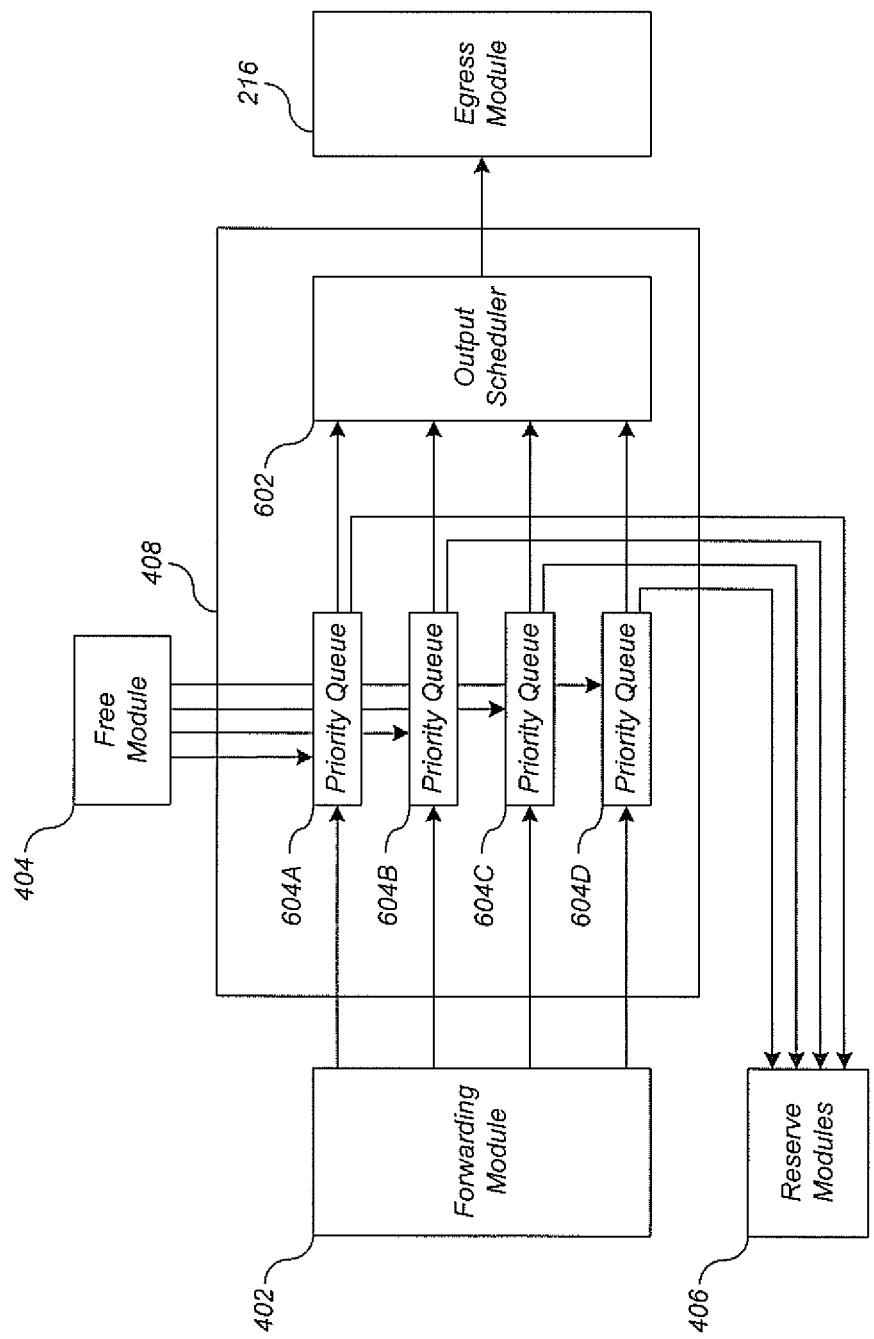
FIG. 6 is a block diagram of an output queue according to one implementation.

FIG. 6 is a block diagram of an output queue 408 according to one implementation. Output queue 408 includes an output scheduler 602 and four priority queues 604A, 604B, 604C, and 604D assigned to classes of service 3, 2, 1, and 0, respectively. Forwarding module 402 enqueues the pointers for each frame to a priority queue selected according to the class of service of the frame. For example, the pointers for a frame having class of service 2 are enqueued to priority queue 604B. Each egress module 216 can transmit only one frame at a time. Therefore output scheduler 602 selects one of the priority queues at a time based on a priority scheme that can be predetermined or selected by a user of the switch, such as a network administrator.

One priority scheme is strict priority. According to strict priority, higher-priority frames are always handled before lower-priority frames. Under this scheme, priority queue 604A transmits until it empties. Then priority queue 604B transmits until it empties, and so on.

Another priority scheme is weighted fair queuing. According to weighted fair queuing, frames are processed so that over time, higher-priority frames are transmitted more often than lower-priority frames according to a predetermined weighting scheme and sequence. One weighting scheme for four classes of service is "8-4-2-1." Of course, other weighting schemes can be used, as will be apparent to one skilled in the relevant art after reading this description.

According to 8-4-2-1 weighting, in 15 consecutive time units, 8 time units are allocated to class of service 3, 4 time units are allocated to class of service 2, 2 time units are allocated to class of service 1, and 1 time unit is allocated to class of service 0. In one implementation, the sequence shown in Table 1 is used with 8-4-2-1 weighting.

TABLE 1

| Time Unit | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Priority | 3 | 2 | 3 | 1 | 3 | 2 | 3 | 0 | 3 | 2 | 3 | 1 | 3 | 2 | 3 |

Thus when none of the priority queues are empty, the sequence of classes of service selected by output scheduler 602 is 3-2-3-1-3-2-3-0-3-2-3-1-3-2-3. When one of the priority queues is empty, its slots in the sequence are skipped. For example, if only priority queue 604A is empty, the sequence of classes of service selected by output scheduler 602 is 2-1-2-0-2-1-2.

In some implementations, free module 404 also employs a priority scheme in satisfying requests for pointers from reserve modules 406. In some implementations, free module 404 employs strict priority in satisfying these requests. In other implementations, free module 404 employs weighted fair queuing in satisfying these requests. In still other implementations, free module 404 employs no priority scheme in satisfying requests for pointers from reserve modules 406

Figure 7:
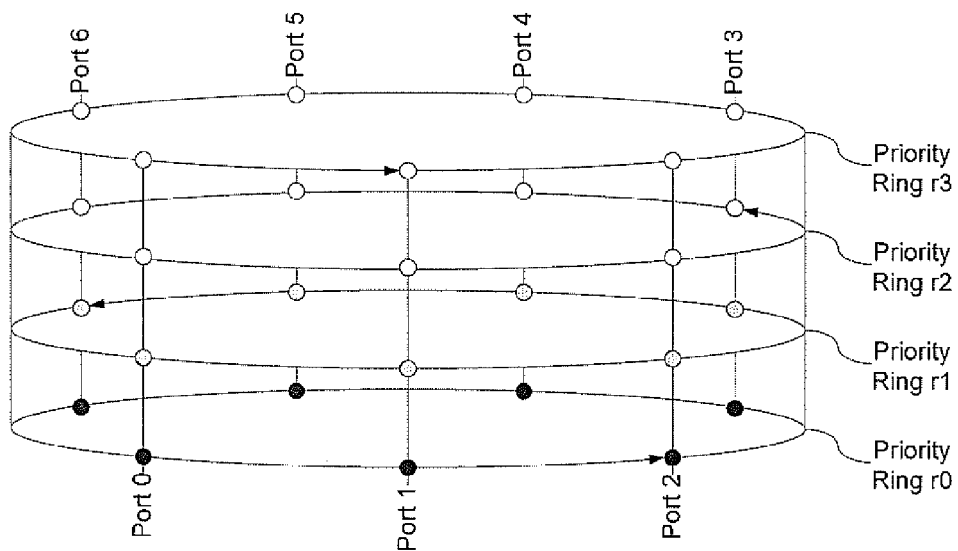
FIG. 7 depicts the logical structure of the process employed by a free module in allocating pointers to ports according to an implementation having 7 ports and 4 classes of service.

FIG. 7 depicts the logical structure 700 of the process employed by free module 404 in allocating pointers to ports according to an implementation having 7 ports and 4 classes of service. Each class of service has a ring. Class of service 0 has a ring r0. Class of service 1 has a ring r1. Class of service 2 has a ring r2. Class of service 3 has a ring r3. Each port has a station on each ring.

Although storing a frame may require multiple buffers, and therefore multiple pointers, free module 404 dispenses pointers to reserve modules 406 one at a time to keep allocation of the pointers both simple and fair. When a reserve module 406 is not full, it requests a pointer. The request includes a priority. In one implementation, the priority is the class of service of the last frame received by the port. In another implementation, the priority is the class of service of the last frame forwarded by the port.

Free module 404 first allocates the requests to the stations on structure 700, and then selects one of the rings to examine using a priority scheme such as weighted fair queuing. Within that ring, free module 404 selects a request by selecting one of the stations on the ring. Free module 404 remembers the last station serviced on each ring, and services the next one so that all stations on a ring are serviced sequentially. If a station has no request for pointers, free module 404 moves on to the next station on the ring. When a pointer has been dispensed to a station on a ring, free module 404 selects another ring according to the priority scheme. When no requests are pending, neither the priority sequence nor the sequential sequence advances. This process ensures that, within a single class of service, requests for free pointers are serviced evenly in a sequential fashion, and that between classes of service, requests for free pointers are serviced according to class of service. As a result, when the switch is congested, ports that receive and forward high-priority frames receive more free pointers. The sizes of the reserves lists for those ports do not decrease as rapidly as those of ports receiving low-priority frames. Therefore, over time, high-priority frames experience less latency than low-priority frames. When flow control is enabled, and the switch is congested, this process ensures that ports receiving high-priority frames assert flow control less often, and therefore handle more frames. Thus even with flow control enabled, the process implements quality of service.

Switch 200 can refuse to store and forward frames. This refusal is also known as "discarding" frames or "dropping" frames. A frame is forwarded by enqueuing the pointers for that frame to an output queue. A frame is discarded by not enqueuing the pointers for that frame to an output queue, but instead keeping those pointers in the reserve module 406. In a multicast operation, where a frame is destined for multiple output queues, that frame may be enqueued to some of the output ports, but not enqueued to others of the output ports, as described below. When a switch discards a frame, some protocols at higher layers, such as transmission control protocol (TCP) detect and retransmit the discarded frame, while other protocols at higher layers, such as user datagram protocol (UDP), take no action.

Each reserve module 406 makes a decision to either forward or drop each frame based on a congestion signal generated by the output queue 408 serving the port to which the frame is destined. In some implementations the level of congestion at an output queue depends on class of service. Referring again to FIG. 6, each output queue 408 has 4 priority queues 604, one for each class of service. Free module 404 maintains a count of the number of free pointers, and provides that count to each priority queue 604. Each priority queue 604 generates a congestion signal based on the count of free pointers and the number of pointers in the priority queue, and provides the congestion signal to each of the reserve modules 406. Thus, referring again to FIG. 4, each reserve module 406 receives four congestion signals from each output queue 408, one for each class of service, and makes the decision to forward or drop a frame based on the congestion signal generated by the output queue 408 for the class of service of the frame. Thus in a switch having 4 classes of service and N ports, each reserve module 406 receives 4N congestion signals.

Figure 8:
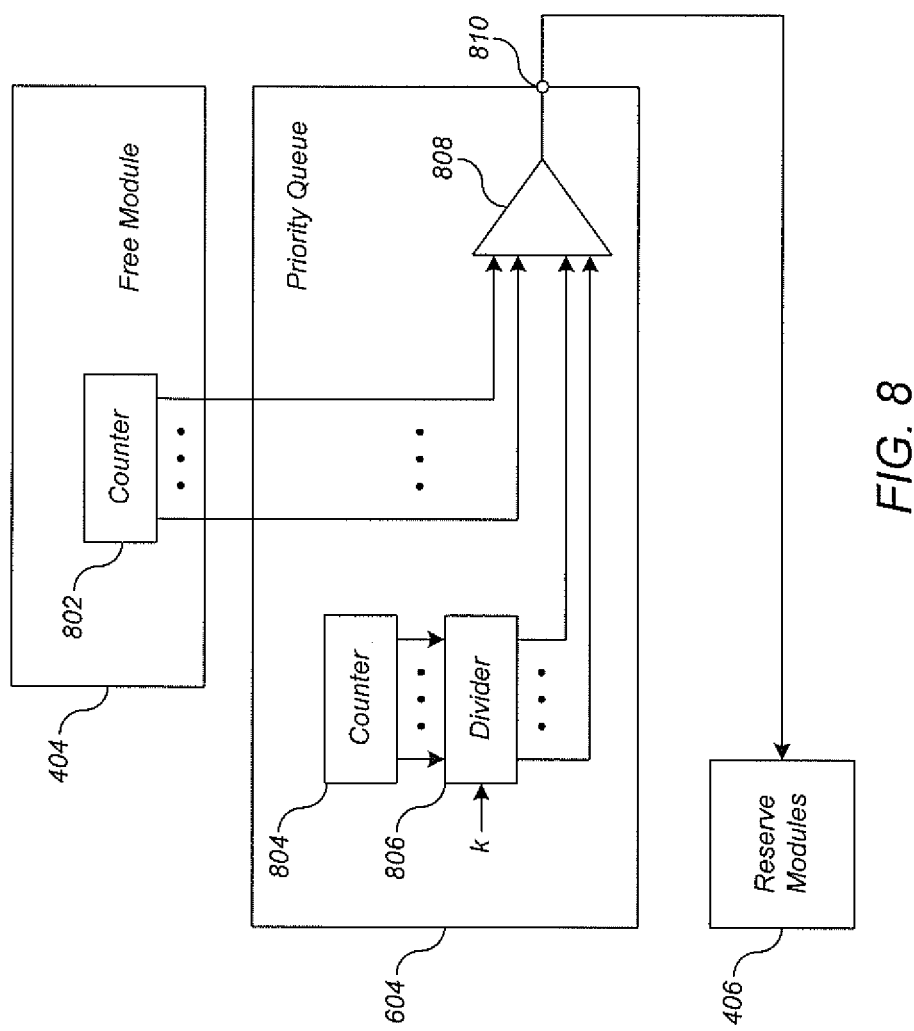
FIG. 8 shows details of a priority queue according to one implementation.

FIG. 8 shows details of a priority queue 604 according to one implementation. Each priority queue 604 includes a counter 804 that maintains a count of the number of pointers j in the priority queue. A divider 806 such as a shift register divides the output of counter 804 by a scale factor k. In some implementations, scale factor k is user-selectable, and can take on any of the values 1, 2, 4 and 8. In some implementations, a different value of scale factor k can be specified for each class of service. In some implementations, the default value for scale factor k is k=4 for all classes of service.

Free module 404 includes a counter 802 that maintains a count of the number of pointers h in the free module. A comparator 808 within priority queue 604 compares the count h with the scaled count j/k, and asserts a "true" congestion signal (for example, a high logic level) at a node 810 when $$\frac{j}{k} \geq h \quad (1)$$

and asserts a "false" congestion signal (for example, a low logic level) otherwise. A reserve module 406 forwards a frame destined for an output queue 408 when the congestion signal generated by that output queue is true for the class of service of the frame, and drops the frame otherwise. For a multicast frame (that is, a frame which is destined for multiple output queues 408), reserve modules 406 make the decision to forward the frame separately for each destination output queue 408 based on the congestion signal generated by that output queue.

Figure 9A:
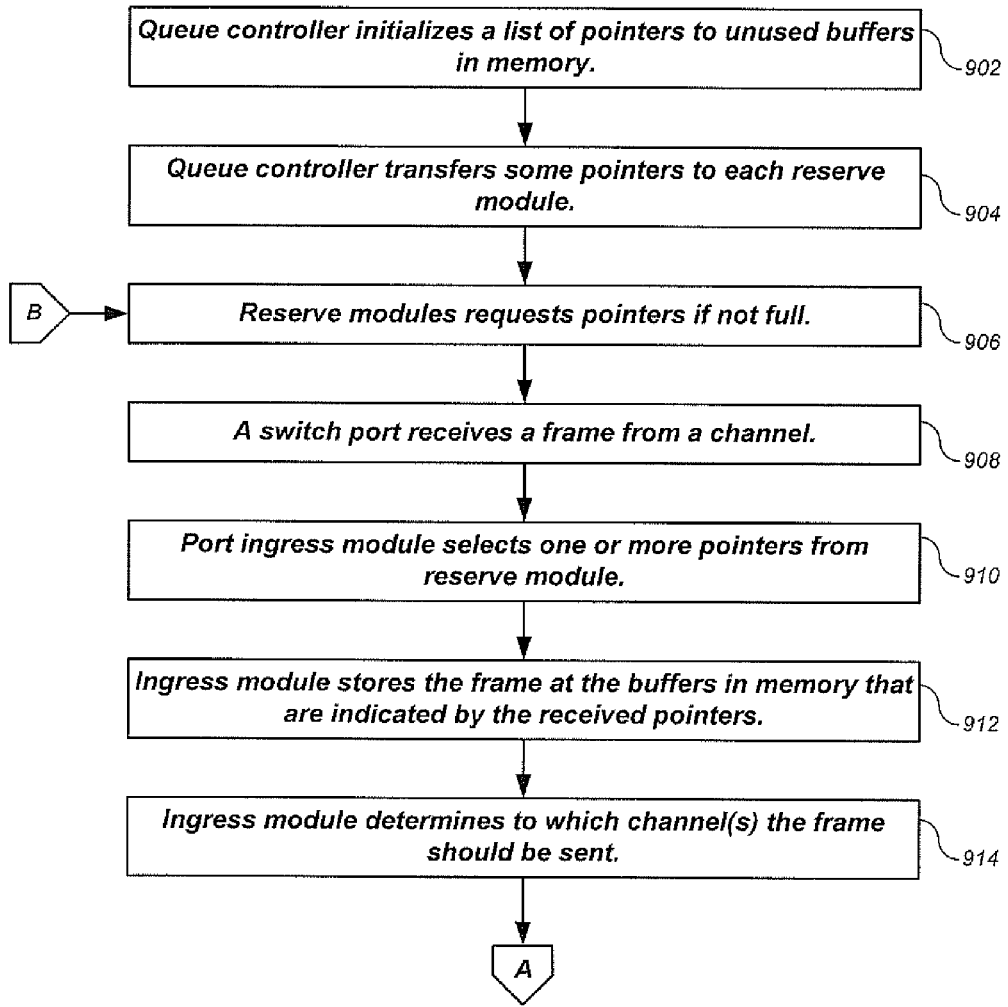
FIGS. 9A and 9B show a flowchart of a process of a network switch under control of a queue controller according to one implementation.
Figure 9B:
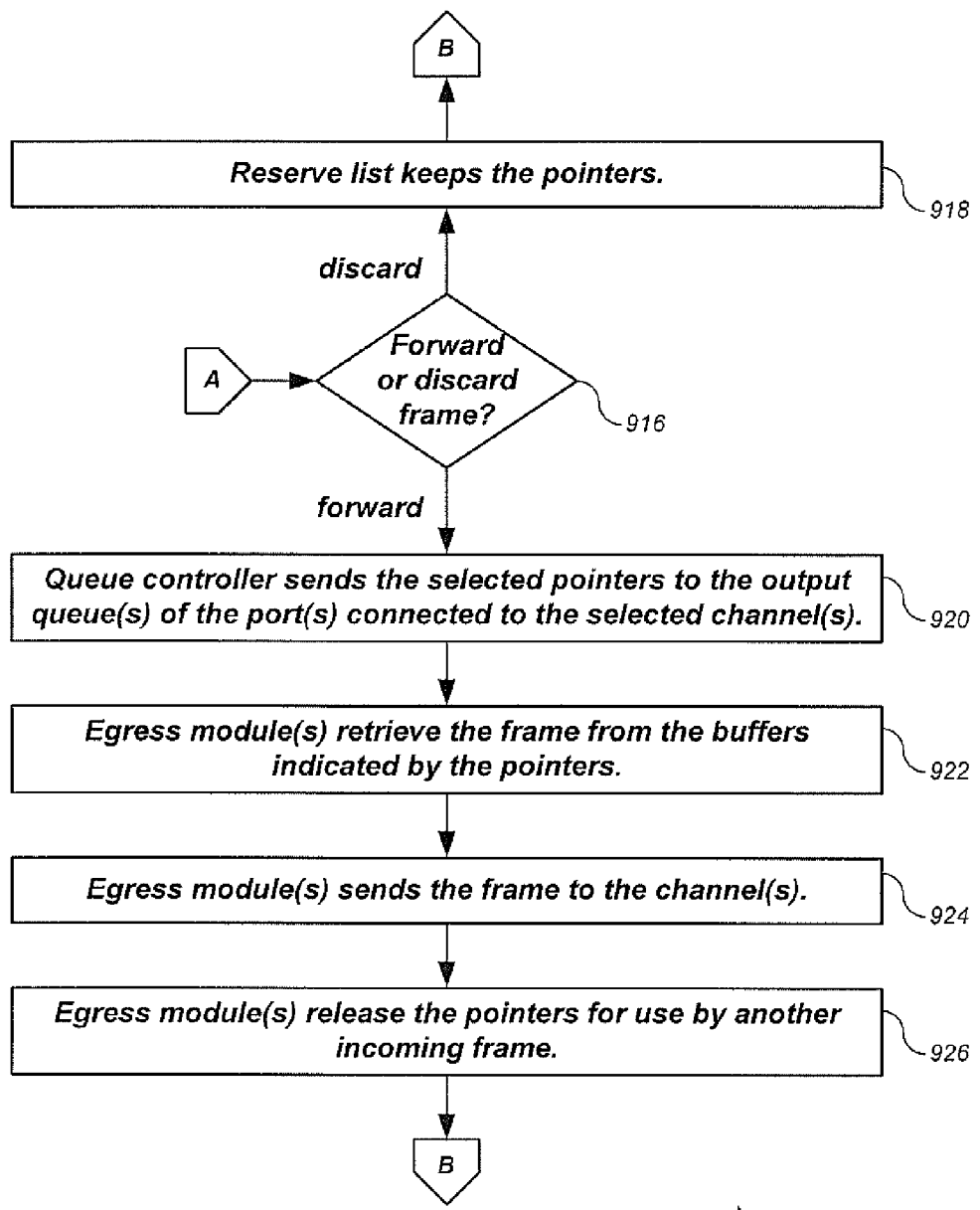

FIGS. 9A and 9B show a flowchart of a process 900 of a network switch such as switch 200 under control of queue controller 400 according to one implementation. At power-on of switch 200, queue controller 400 initializes a free module 404 to contain a number of pointers to unused buffers in memory 208 (step 902). Queue controller 400 transfers some of these pointers to each reserve module 406 (step 904).

Each reserve module 406 includes a counter to count the number of pointers in the reserve module. When the number of pointers is below the capacity of the reserve module 406, the reserve module continually requests pointers from free module 404 (step 906). In some implementations, the capacity of each reserve module 406 is 4 pointers, where a frame of maximum size requires 3 pointers.

A port 202 of switch 200 receives a frame from a channel 204 (step 908). The frame enters the port 202 connected to the channel 204 and traverses the PHY 210 and MAC 212 of the port 202 to reach the ingress module 214 of the port 202. Ingress module 214 selects one or more pointers from the reserve module 406 for the port 202 (step 910). Ingress module 214 stores the frame in memory 208 at the buffers that are indicated by the received pointers (step 912).

Ingress module 214 then determines the destination channel (or channels in the case of a multicast operation) to which the frame should be sent, according to methods well-known in the relevant arts (step 914). Reserve module 406 then determines whether the frame should be forwarded or discarded based on the congestion signal generated for the class of service of the frame by the output queue 408 serving the destination channel (step 916). Reserve module 406 forwards the frame to the destination channel when the number of pointers j in the priority queue 604 for the class of service of the frame exceeds the product of the scale factor k and the number of pointers h in free module 404. When a frame is dropped, the reserve module 406 keeps the pointers for that frame (step 918), and process 900 resumes at step 906.

When a frame is forwarded, queue controller 206 sends the selected pointers to the output queues 408 for the ports connected to the destination channels (step 920). When the pointers for the frame reach the head of an output queue 408 of a port 202, the egress module 216 of the port retrieves the frame from the buffers indicated by the pointers (step 922) and sends the frame to its channel 204 (step 924). The output queue 408 then releases the pointers by returning them to free module 404 (step 926). Process 900 then resumes at step 906.

By gradually discarding frames based on class of service as the switch becomes more congested, process 900 effectively reserves more free buffers for frames having high classes of service. Therefore, process 900 serves to minimize the ingress latency for high-priority frames, in accordance with the objectives of quality of service.

An example of process 900 is now discussed with reference to FIG. 1. Device 104A has data to transmit to device 104B. Device 104A generates a frame of the data, and selects device 104B as the destination for the frame. Device 104A then sends the frame to channel 106A. The frame subsequently arrives at switch 102.

Switch 102 has a memory including a plurality of memory buffers in for storing a frame. The buffers include n available buffers and p unavailable buffers such that m=n+p. Switch 102 reserves g of the n buffers for channel 106A by sending q pointers to the reserve module 406 for channel 106A. Switch 102 also reserves some of the remaining available buffers to other channels. When switch 102 receives the frame from channel 106A, it stores the frame in i of the q buffers, wherein $1 \leq i \leq q$, thereby changing the status of the i buffers to unavailable. In one implementation, $1 \leq i \leq 3$.

Switch 102 selectively assigns the frame to channel 106B (that is, determines whether to send the frame to channel 106B) based on the number of the buffers j assigned to channel 106B (that is, the number of pointers h stored in the output queue 408 serving channel 106B) and the number of the buffers h neither reserved nor assigned to any channel, where $i+j \leq m$ and $h+q \leq n$.

If the number of the buffers j assigned to channel 106B and storing frames having the same class of service as the frame is less than the product of the scale factor k and the number of the buffers h neither reserved nor assigned to any channel, switch 102 sends the frame to channel 106B and changes the status of the i buffers to available. Device 104B then receives the frame. But if the number of the buffers j assigned to channel 106B and storing frames having the same class of service as the frame is greater than, or equal to, the product of the scale factor k and the number of the buffers h neither reserved nor assigned to any channel, switch 102 discards the frame and changes the status of the i buffers to available.

Figure 10:
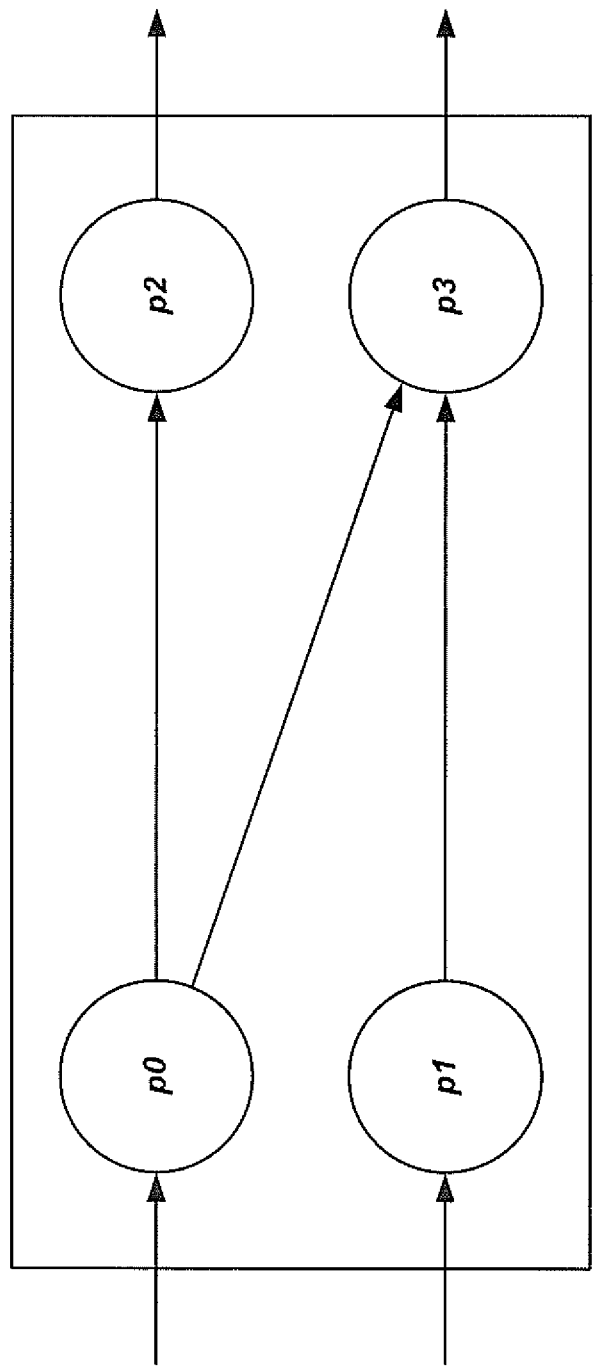
FIG. 10 shows four ports p0, p1, p2, and p3 in a switch to illustrate head-of-line blocking.

Implementations of the present invention solve a problem known as head-of-line blocking (HOLB). HOLB occurs when congested flows in a switch cause frames to be dropped from uncongested flows. Consider the following case, illustrated in FIG. 10, which shows four ports p0, p1, p2, and p3 in a switch 902. All of the ports run at 100 Mbps. All of the frames arriving a port p0 have class of service 0, while all of the frames arriving a port p1 have class of service 1.

Port p1 sends all of its frames to port p3. Port p0 sends 50% of its frames to port p2, and sends the other 50% of its frames to port p3. Port p2 is uncongested. However, port p3 is congested because the amount of data arriving at port p3 is greater than the amount of data port p3 can transmit. In a conventional switch, the congestion at port p3 causes both ports p0 and p1 to begin dropping frames, including frames destined for uncongested port p2.

In implementations of the present invention, each port forwards a frame to another port based on the level of congestion in that port. With weighted fair queueing, the output queue's scheduler empties the priority queues so that the congestion signals asserted by port p3 will be true for class of service 0 twice as often as for class of service 1 in the steady state. Therefore in port p3, the priority queue for class of service 1 will drain twice as fast as the priority queue for class of service 0.

Therefore in the steady state, each of ports p0 and p1 drops frames destined for port p3. However, because port p2 is uncongested, its congestions signals are always false. Therefore none of the frames destined for port p2 are dropped. Thus implementations of the present invention implement quality of service while solving head-of-line blocking.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method for transferring a first frame of data received at a first port of a network switch to a second port of the network switch, the method comprising:
    maintaining a first list of pointers, wherein first pointers in the first list of pointers point respectively to a plurality of buffers, wherein the plurality of buffers are implemented in a memory, wherein the first pointers are available to be reserved, and wherein the network switch comprises the memory;
    maintaining a second list of pointers, wherein second pointers in the second list of pointers are reserved;
    selectively allocating one of the plurality of buffers to the first port of the network switch;
    in response to i) receiving the first frame of data at the first port and ii) the one of the plurality of buffers being allocated to the first port,
    storing the first frame of data in the memory, and
    transferring one of the first pointers for the one of the plurality of buffers from the first list of pointers to the second list of pointers;
    transferring, to an output queue associated with the second port, the one of the first pointers for the one of the plurality of buffers;
    determining whether a number of the second pointers is greater than a product of i) a scale factor, and ii) a number of the first pointers;
    based on the determination, transmitting the first frame of data from the second port; and
    in response to the first frame of data being sent from the second port, transferring the one of the first pointers for the one of the plurality of buffers from the second list of pointers back to the first list of pointers.

2. The method of claim 1, wherein:
    the selective allocation of the one of the plurality of buffers to the first port of the network switch comprises selectively allocating the one of the plurality of buffers such that a first plurality of frames are transmitted from the network switch prior to a second plurality of frames; and
    the first plurality of frames have a higher priority than the second plurality of frames.

3. The method of claim 1, wherein:
    the selective allocation of the one of the plurality of buffers to the first port of the network switch comprisesselectively allocating the one of the plurality of buffers in accordance with a weighting scheme such that a first plurality of frames are transmitted from the network switch more often than a second plurality of frames; and
    the first plurality of frames have a higher priority than the second plurality of frames.

4. The method of claim 1, further comprising:
    receiving a plurality of frames of data, wherein the selective allocation of the one of the plurality of buffers to the first port of the network switch comprises selectively allocating the one of the plurality of buffers in accordance with a weighting scheme; and
    transmitting the plurality of frames of data from the network switch according to the weighting scheme, wherein:
    the weighting scheme comprises an "8-4-2-1" weighting of four respective classes of services; and
    each of the plurality of frames of data corresponds to one of the classes of services.

5. The method of claim 1, wherein subsequent to the transferring of the one of the first pointers for the one of the plurality of buffers back to the first list of pointers, the one of the plurality of buffers is available to store a second frame of data.

6. The method of claim 1, further comprising:
    receiving the first frame of data via a first channel;
    determining whether to store the first frame of data in the one of the plurality of buffers;
    determining destination channels of the first frame;
    enqueuing the one of the first pointers for the first frame of data to one of a plurality of priority queues, wherein each of the plurality of priority queues is assigned to a respective class of service and is configured to store pointers for the respective class of service; and
    selecting the one of the plurality of priority queues according to a class of service of the first frame of data.

7. The method of claim 6, further comprising discarding the first frame of data when the number of second pointers is less than or equal to the product of (i) the scale factor, and (ii) the number of first pointers.

8. The method of claim 6, further comprising:
storing the first pointers in a free module;
requesting, via a reserve module, one or more of the first pointers from the free module;
based on the request for the one or more of the first pointers, providing the one or more of the first pointers from the free module to the reserve module, wherein the one or more first pointers provided to the reserve module point to ones of the plurality of buffers with a status of available;
storing a second frame of data in the ones of the plurality of buffers with a status of available; and
in response to the second frame being stored in the ones of the plurality of buffers with a status of available, changing statuses of the ones of the plurality of buffers with a status of available to unavailable.

9. The method of claim 8, further comprising:
generating a congestion signal based on the class of service of the first frame of data;
based on the congestion signal, determining via the reserve module whether to forward or discard the first frame of data; and
forwarding the first frame of data to the destination channels when the number of second pointers exceeds the product of (1) the scale factor, and (ii) the number of first pointers.

10. The method of claim 8, further comprising:
discarding the first frame of data when the number of second pointers is less than or equal to the product of (i) the scale factor, and (ii) the number of first pointers; and
refraining from assigning the first pointers stored in the reserve module to the plurality of buffers when the first frame of data is discarded.

11. A network switch comprising:
a plurality of ports including a first port and a second port;
a memory comprising a plurality of buffers, wherein the memory is configured to be shared by the plurality of ports; and
a queue controller configured to
maintain a first list of pointers, wherein first pointers in the first list of pointers point respectively to the plurality of buffers, wherein the first pointers are available to be reserved,
maintain a second list of pointers, wherein second pointers in the second list of pointers are reserved,
allocate one of the plurality of buffers to the first port,
in response to i) the first port receiving a first frame of data, ii) the one of the plurality of buffers being allocated to the first port, and iii) the first frame of data being stored in the memory, transfer the pointer for the one of the plurality of buffers from the first list of pointers to the second list of pointers,
transfer, to an output queue associated with the second port, one of the first pointers for the one of the plurality of buffers,
determine whether a number of the second pointers is greater than a product of i) a scale factor, and ii) a number of the first pointers,
based on the determination, transmit the first frame of data from the second port, and
in response to the first frame of data being sent from the second port, transfer the one of the first pointers for the one of the plurality of buffers from the second list of pointers back to the first list of pointers.

12. The network switch of claim 11, wherein:
the queue controller is configured to selectively allocate the one of the plurality of buffers such that a first plurality of frames are transmitted from the network switch prior to a second plurality of frames; and
the first plurality of frames have a higher priority than the second plurality of frames.

13. The network switch of claim 11, wherein:
the queue controller is configured to selectively allocate the one of the plurality of buffers in accordance with a weighting scheme such that a first plurality of frames are transmitted from the network switch more often than a second plurality of frames; and
the first plurality of frames have a higher priority than the second plurality of frames.

14. The network switch of claim 11, wherein:
the queue controller is configured to
receive a plurality of frames of data, wherein the selective allocation of the one of the plurality of buffers to the first port of the network switch comprises selectively allocating the one of the plurality of buffers in accordance with a weighting scheme, and
transmit the plurality of frames of data from the network switch according to the weighting scheme;
the weighting scheme comprises an "8-4-2-1" weighting of four respective classes of services; and
each of the plurality of frames of data corresponds to one of the classes of services.

15. The network switch of claim 11, wherein, subsequent to the transferring of the one of the first pointers for the one of the plurality of buffers, the one of the plurality of buffers is available to store a second frame of data.

16. The network switch of claim 11, further comprising:
an ingress module configured to (i) receive the first frame of data via a first channel, (ii) determine whether to store the first frame of data in the one of the plurality of buffers, and (iii) determine destination channels of the first frame;
a plurality of priority queues, wherein each of the plurality of priority queues is assigned to a respective class of service and is configured to store pointers for the respective class of service; and
a forwarding module configured to enqueue the pointer for the first frame of data to one of the plurality of priority queues, wherein the one of the plurality of priority queues is selected according to a class of service of the first frame of data.

17. The network switch of claim 16, further comprising a reserve module configured to store some of the second pointers, wherein:
the output queue comprises the plurality of priority queues;
the output queue is configured to generate a congestion signal based on the class of service of the first frame of data; and
the reserve module is configured to
based on the congestion signal, determine whether to forward or discard the first frame of data, and
forward the first frame of data to the destination channels when the number of second pointers exceeds the product of (i) the scale factor, and (ii) the number of first pointers.

18. The network switch of claim 17, further comprising a free module configured to store the first pointers, wherein:
the reserve module is configured to request one or more of the first pointers from the free module;
based on the request for the one or more of the first pointers, the free module is configured to provide the one or more first pointers to the reserve module;

the one or more first pointers provided to the reserve module point to ones of the plurality of buffers with a status of available;

the ingress module is configured to store a second frame of data in the ones of the plurality of buffers with a status of available; and the reserve module is configured to, in response to the second frame being stored in the ones of the plurality of buffers with a status of available, change statuses of the ones of the plurality of buffers with a status of available to unavailable.

19. The network switch of claim 17, wherein the reserve module is configured to discard the first frame of data when the number of second pointers is less than or equal to the product of (i) the scale factor, and (ii) the number of first pointers.

20. The network switch of claim 19, wherein the reserve module is configured to refrain from assigning the first pointers stored in the reserve module to the plurality of buffers when the first frame of data is discarded.

* * * * *